Aug. 14, 1951 W. T. WALKER 2,564,289
LIFT MECHANISM
Filed March 7, 1945 2 Sheets-Sheet 1
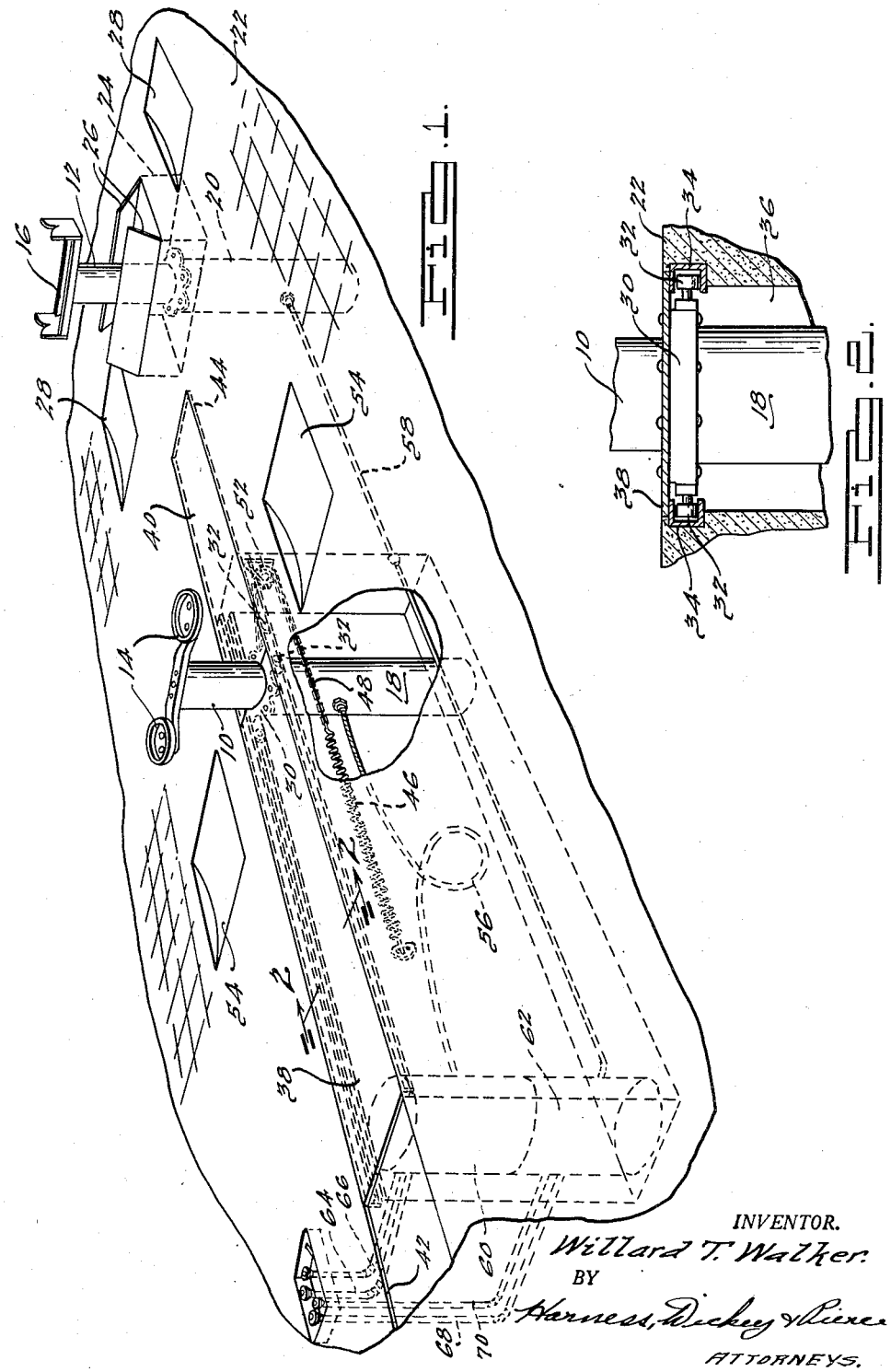
INVENTOR.
Willard T. Walker
BY
Harness, Dickey & Pierce
ATTORNEYS.

Aug. 14, 1951 — W. T. WALKER — 2,564,289
LIFT MECHANISM
Filed March 7, 1945 — 2 Sheets-Sheet 2
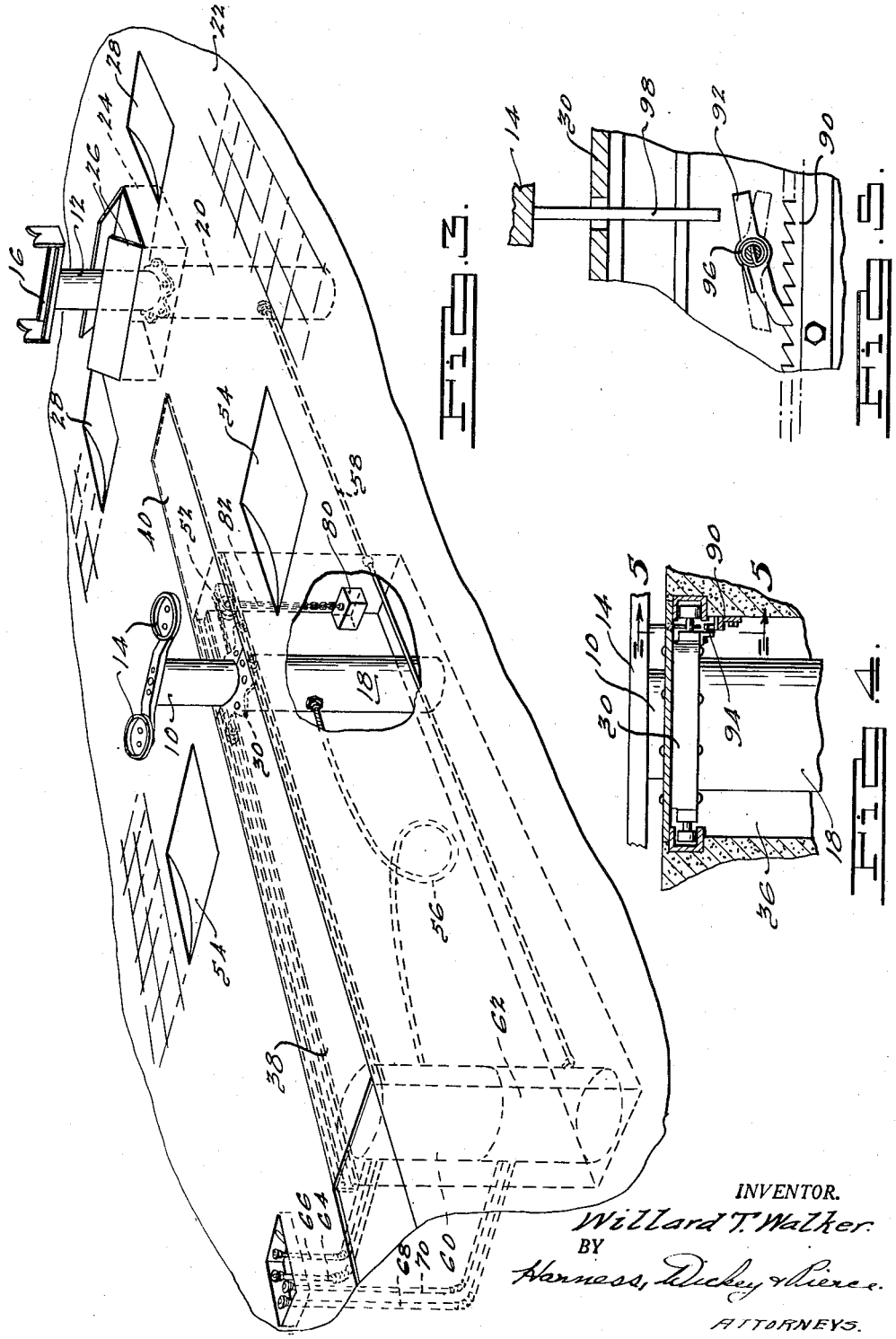
INVENTOR.
Willard T. Walker
BY
Harness, Dickey & Pierce
ATTORNEYS.

Patented Aug. 14, 1951

2,564,289

UNITED STATES PATENT OFFICE 2,564,289

LIFT MECHANISM

Willard T. Walker, Racine, Wis., assignor to Walker Manufacturing Company of Wisconsin, Racine, Wis., a corporation of Wisconsin Application March 7, 1945, Serial No. 581,469

8 Claims. (Cl. 254—89)

The present invention relates to vehicle lifts, and is particularly directed to the provision of an improved such structure which is automatically adjustable to accommodate vehicles of different wheel bases.

Principal objects of the present invention are to provide a vehicle lift system of the above indicated type, which is simple in arrangement, economical of manufacture and erection, and which is reliable and efficient in operation; to provide such a system comprising generally a pair of raisable and lowerable columns, which are spaced apart lengthwise of the vehicles, and the space wherebetween is automatically adjustable to accommodate vehicles of different wheel bases; to provide such a system wherein each column carries a cradle which is adapted to supportingly engage a corresponding front or rear portion of the associated vehicle; to provide such a system wherein one of the columns is movable longitudinally of the vehicle, as an automatic incident to the operation of driving the vehicle on to the lift, and is provided with automatic means to restore it to an initial or normal position with respect to the companion column, such normal spacing being no less than the minimum expected wheel bases of the vehicles for which the system is designed; and to generally improve the construction and operation of vehicle lifts of the spaced column type.

With the above as well as other and more detailed objects in view, which appear in the following description, and in the appended claims, preferred but illustrative embodiments of the invention are diagrammatically shown in the accompanying drawings, throughout the several views of which corresponding reference characters are used to designate corresponding parts and in which:

Figure 1 is a perspective view of a vehicle lift embodying the invention;

Figure 2 is a sectional view, taken along the line 2—2 of Figure 1;

Figure 3 is a view in perspective of a modified embodiment of the invention;

Figure 4 is a fragmentary view of a further modification of the invention; and,

Figure 5 is a fragmentary view taken along the line 5—5 of Figure 4.

Referring first to Figures 1 and 2, the illustrative lift system comprises a pair of spaced raisable and lowerable columns 10 and 12, column 10 being associated, for example, with the front ends of associated vehicles, and column 12 being associated with the rear ends of such vehicles.

With this relation, column 10 is surmounted by a vehicle supporting cradle structure 14 which may be proportioned, for example, to engage under portions associated with conventional front wheel suspensions. Similarly, column 12 is surmounted by a cradle structure 16, which is adapted to receive portions of the rear axle structure at opposite sides of the differential gear housing.

In the present instance, the lift is illustrated as being of the hydraulic type. Consequently, columns 10 and 12 constitute, respectively, the pistons associated with front and rear hydraulic rams 18 and 20. The rear hydraulic ram 20 is fixedly supported in a pit provided therefor in the associated floor structure 22. When retracted, cradle 16 lies within a box-like structure 24, which is provided at the top of the associated pit, and this box-like structure may be provided with closure plates 26. Wheel depressions 28 are provided in alignment with the ram 20, to assist the operator in properly positioning the rear axle structure over the cradle 16.

The ram 18 is rigidly secured to a carriage 30, provided at each side with spaced pairs of supporting rollers 32. Rollers 32 are provided with channel-shaped ways 34 which, as shown, are recessed into the walls of the associated elongated pit 36.

Pit 36 is adapted to be covered, in the present arrangement, and in all positions of the ram 18, by means of a pair of cover plates 38 and 40, which are rigidly secured, at their ends, to the carriage 30. In the normal or retracted position of the ram 18, cover 38 covers all that portion of the pit 36 which is in advance of ram 18, and the end of this plate is positioned at approximately the end of the pit 36. Under these conditions, the front portion of plate 40 covers the balance of pit 36, and the balance of plate 40 overlies the floor 22 in the space between rams 18 and 20. Preferably, and as illustrated, the floor 22 is shallowly recessed as indicated at 42 and 44, so that the surfaces of the plates 38 and 40 lie substantially flush with the surface of the floor 22. As appears in Figure 2, the plates 38 and 40 are slidably supported, during their movements, upon the upper surfaces of the roller ways 34. It will be appreciated from the foregoing that ram 18 is movable lengthwise of the lift system from the normal or retracted position shown in the drawing to a position in which it is adjacent the other end of the pit 36.

Preferably, and in further accordance with the present invention, means are provided to cause an automatic return of ram 18 to the retracted position. As shown, this automatic return means comprises a continuously acting spring 46, one end whereof is anchored to the wall of the pit, and the other end of which is connected to a chain 48, which is trained over an idler sheave 52, and is connected to the carriage 30. Spring 46 is thus effective not only to return ram 18 to the normal position, but to retain it thereat. A limit to such return movement may, of course, be afforded in various ways. As shown, it is afforded by the engagement between the rear end of plate 40 and its associated recess 44. In such return position, cradle 14 is aligned with the wheel recesses 54, provided in the floor 22.

Any of a variety of arrangements may be used to effect the raising and lowering of the rams. In the present system, it is preferred to control the ram 18 independently of the ram 20. Consequently, the usual ram supply lines 56 and 58 extend, respectively, from rams 18 and 20 to reservoirs 60 and 62, which are individual thereto. Reservoir 60 is provided with selectively controllable means, represented by the lines 64 and 66, for admitting and exhausting an elastic fluid, such as air, to and from the space above the oil in reservoir 60. Reservoir 62 is similarly provided with control lines 68 and 70.

As to operation, it will be appreciated that both columns are normally retracted, under which conditions cradle 16 is concealed within the box 24, and cradle 14 rests upon the upper surface of the floor. This cradle may also be recessed, but since it has little vertical height, no such recessing is illustrated. To effect a lifting operation, the associated vehicle is driven lengthwise of the lift system to a position in which its front wheels are received in the recesses 54. If the vehicle is of minimum wheel base, such operation will also bring the rear wheels into recess 28. Under these conditions, no bodily movement of ram 18 is necessary and the lifting operation may be completed by simultaneously admitting air to each of reservoirs 60 and 62. This operation forces oil into rams 18 and 20 and elevates columns 10 and 12, carrying the vehicle upwardly therewith.

Usually the vehicle wheel base is longer than the minimum spacing between columns 10 and 12. Consequently, at the time the front wheels enter recesses 54, the rear wheels are spaced from the recesses 28. Under these conditions, ram 18 is supplied with oil in sufficient quantity to elevate cradle 14 into firm supporting engagement with the front end of the vehicle. Preferably, such movement of column 10 is to be continued sufficiently to elevate the front wheels above the level of the floor 22. Thereafter, the vehicle is driven farther on to the lift, during which movement, cradle 14, column 10, and ram 18 are advanced along the pit. When the rear wheels enter recesses 28, both rams 18 and 20 are supplied with fluid, completing the lifting operation.

In lowering the vehicle, the elastic fluid is exhausted from both of reservoirs 60 and 62, at a controlled rate, enabling columns 10 and 12 to be lowered to their normal retracted positions under the influence of gravity. When this lowering movement of column 10 has progressed sufficiently far to free it from the front end of the vehicle, spring 46, which was loaded by the advancing movement of ram 18, is enabled to initiate a return movement thereof, automatically preparing the system for the next operation, and enabling the vehicle to be driven off of the lifting structure in either a forward or reverse direction.

The modified embodiment of the invention shown in Figure 3 corresponds to the embodiment described above with the exception that in Figure 3 the retracting means for the ram 18 comprises a counterweight 80, which is connected to carriage 30, through a chain 82, which is trained over the idler sheave 52. As far as operation is concerned, the two systems are alike.

In each of the above embodiments, the return mechanism may be proportioned so as to provide a desirably gradual return movement of the associated ram 18. It will be noticed that the return movement, as described, can begin as soon as, in a lowering operation, cradle 14 is relieved of the vehicle load. The slow return movement serves to obviate any danger of causing injury to the under body parts of the vehicle, during the course of the return movement. It is within the purview of the invention to provide means to prevent the initiation of the return movement until such a time as cradle 14 has been lowered away from the vehicle sufficiently far to insure that the under body parts of the vehicle will be clear of the cradle. An illustrative arrangement for accomplishing this is shown in Figures 4 and 5. In these figures, a ratchet bar 90 is secured to one wall of the pit 36, and a pawl 92 is carried by a bracket 94 which is secured to the carriage 30. A spring 96 continuously urges the pawl 92 into engagement with the teeth of the ratchet bar 90. In order to release the pawl 92, when the cradle 14 is either fully lowered, or sufficiently lowered to clear the under body of an associated vehicle, cradle 14 is provided with a downwardly projecting operator 98, which is disposed to engage and release the pawl 92.

With this arrangement, it will be appreciated that pawl 92 does not interfere with movements of ram 18 in a direction to increase the spacing between rams 18 and 20. Pawl 92 does, however, act to prevent a return movement of ram 18 unless and until carriage 30 has been lowered sufficiently to release pawl 92.

It will be appreciated from the foregoing that the present invention provides an extremely simple and efficient vehicle lift system, characterized as being arranged for automatic adjustment to suit the wheelbase of the vehicle being lifted. At the same time, the use of the two spaced columns frees the under body structure of the car from obstructions which would interfere with greasing or other operations which are to be performed while the vehicle is elevated.

Although only two specific embodiments of the invention have been described in detail, it will be appreciated that various further modifications in the form, number, and arrangement of the parts may be made without departing from the spirit and scope of the invention.

What is claimed is:

1. In a vehicle lift, a plurality of raisable and lowerable relatively movable supports spaced lengthwise of the vehicle and each adapted to supportingly engage the vehicle at points spaced apart longitudinally of each other, return means for urging one of said supports to a position of minimum spacing from another of said supports, said means having relatively movable elements for permitting said one support, when supportingly engaged with a vehicle, to be moved along therewith by and in response to the movement of a vehicle onto the lift, and actuatable means operable as an incident to the raising of said one support in a direction to support a vehicle for rendering said return means ineffective to return said one support when said one support is supportingly engaged with a vehicle.

2. In a vehicle lift, a plurality of raisable and lowerable relatively movable supports spaced lengthwise of the vehicle and each adapted to supportingly engage the vehicle at points spaced apart longitudinally of each other, return means for urging one of said supports to a position of minimum spacing from another of said supports, said means having relatively movable elements for permitting said one support, when supportingly engaged with a vehicle, to be moved along therewith by and in response to the movement of a vehicle onto the lift, and actuatable means operable as an incident to the lowering of said one support for rendering said return means ineffective except when said one support is lowered out of supporting engagement with a said vehicle.

3. The system of claim 1 wherein said actuatable means comprises a ratchet bar and pawl.

4. The system of claim 2 wherein said actuatable means comprises a ratchet bar and pawl and an actuating means for releasing said pawl solely subsequently to the lowering of said one support sufficiently to clear the vehicle.

5. In a vehicle lift, a plurality of supports spaced lengthwise of the vehicle and each adapted to supportingly engage the vehicle at points spaced apart longitudinally of each other, said supports being movable between raised positions in which they support and lift the vehicle and retracted positions in which they clear the vehicle, means mounting at least one of said supports for movement in a direction to vary the spacing between said supports, means providing an initial position for said one support, said mounting means enabling a said movement of said one support to thereby permit the establishment of a spacing between said supports which suits the wheelbase of said vehicle, locating means having a fixed position relative to said one support initial position and adapted to cooperate with a portion of a vehicle to be raised for locating the vehicle with respect to said one support solely when said one support is in said initial position, and force exerting means effective when said one support is clear of the vehicle for effecting a return of said one support to said initial position.

6. In a vehicle lift, a plurality of supports spaced lengthwise of the vehicle and each adapted to supportingly engage the vehicle at points spaced apart longitudinally of each other, said supports being movable between raised positions in which they support and lift the vehicle and retracted positions in which they clear the vehicle, means mounting at least one of said supports for movement in a direction to vary the spacing between said supports, said means enabling a said movement of said one support to thereby permit the establishment of a spacing between said supports which suits the wheelbase of said vehicle, means effective when said one support is clear of the vehicle for effecting a return of said one support to establish a normal spacing between said supports, and actuatable means operable as an incident to the support of a vehicle by said one support for rendering said return means ineffective when said one support is supportingly engaged with a vehicle, said actuatable means being rendered ineffective to render said return means ineffective solely subsequent to movement of said one support to a position in which it is in a sufficiently lowered position to clear the underbody of a vehicle on the lift.

7. In a vehicle lift, a plurality of supports spaced lengthwise of the vehicle and each adapted to supportingly engage the vehicle at points spaced apart longitudinally of each other, said supports being movable between raised positions in which they so support and lift the vehicle and retracted positions in which they clear the vehicle, means mounting at least one of said supports for movement in a direction to vary the spacing between said supports, said means enabling a said movement of said one support to thereby establish a spacing between said supports which suits the wheelbase of said vehicle, force exerting means for effecting a return of said one support to establish a normal spacing between said supports, and means for rendering said last-named means effective to effect a return of said one support solely when said one support has been lowered away from the vehicle a sufficient distance to clear the vehicle.

8. In a vehicle lift, a plurality of supports spaced lengthwise of the vehicle and each adapted to supportingly engage the vehicle at points spaced apart longitudinally of each other, said supports being movable between raised positions in which they so support and lift the vehicle and retracted positions in which they clear the vehicle, means mounting at least one of said supports for movement in a direction to vary the spacing between said supports to thereby permit the establishment of a spacing between said supports which suits the wheelbase of said vehicle, means providing an initial position for said one support, means adapted to cooperate with a portion of a vehicle to be raised for locating the vehicle with respect to said one support when said one support is in said initial position, and force exerting means effective when said one support is clear of the vehicle for effecting a return of said one support to said initial position irrespective of the position of said vehicle whereby said locating means is effective to locate a vehicle with respect to said one support.

WILLARD T. WALKER.

REFERENCES CITED

The following references are of record in the file of this patent:

UNITED STATES PATENTS

| Number | Name | Date |
|---|---|---|
| 2,015,357 | Weaver | Sept. 24, 1935 |
| 2,100,617 | Thompson | Nov. 30, 1937 |
| 2,199,524 | Kroll | May 7, 1940 |